United States Patent [19]
Wood

[11] Patent Number: 5,763,038
[45] Date of Patent: Jun. 9, 1998

[54] PROGRESSIVELY PERFORATED TAPE ROLL

[75] Inventor: Thomas L. Wood, Maplewood, Minn.

[73] Assignee: Minnesota Mining and Manufacturing Company, St. Paul, Minn.

[21] Appl. No.: 806,186

[22] Filed: Feb. 25, 1997

[51] Int. Cl.$^6$ ..................................................... C09J 7/02
[52] U.S. Cl. ........................ 428/43; 15/104.002; 428/343; 428/906
[58] Field of Search .......................... 428/43, 343, 906; 15/104.002

[56] References Cited

U.S. PATENT DOCUMENTS

| | | |
|---|---|---|
| D. 247,143 | 2/1978 | Rivas . |
| D. 273,058 | 3/1984 | McKay . |
| D. 273,059 | 3/1984 | McKay . |
| D. 276,763 | 12/1984 | McKay . |
| D. 295,833 | 5/1988 | Roth . |
| 2,401,842 | 6/1946 | Slater . |
| 2,702,913 | 3/1955 | Walkama . |
| 2,724,847 | 11/1955 | Krasno . |
| 3,013,367 | 12/1961 | Sarre . |
| 3,201,815 | 8/1965 | Selby . |
| 3,231,918 | 2/1966 | Marks . |
| 3,299,461 | 1/1967 | Marks . |
| 3,342,325 | 9/1967 | Dreher . |
| 3,343,194 | 9/1967 | Ramelson . |
| 3,363,276 | 1/1968 | Thomas, Jr. . |
| 3,389,416 | 6/1968 | Timms . |
| 3,417,418 | 12/1968 | Riboud . |
| 3,421,170 | 1/1969 | Thomas, Jr. . |
| 3,623,179 | 11/1971 | Roth . |
| 3,742,547 | 7/1973 | Sohmer . |
| 3,770,542 | 11/1973 | Hall et al. . |
| 3,823,887 | 7/1974 | Gerstein . |
| 3,899,075 | 8/1975 | Hall et al. . |
| 4,297,403 | 10/1981 | Smith . |
| 4,361,923 | 12/1982 | McKay . |
| 4,399,579 | 8/1983 | McKay . |
| 4,422,201 | 12/1983 | McKay . |
| 4,427,726 | 1/1984 | Wolfrum . |
| 4,570,280 | 2/1986 | Roth . |
| 4,727,616 | 3/1988 | Kucera et al. . |
| 4,783,015 | 11/1988 | Shimizu . |
| 4,807,825 | 2/1989 | Elsner et al. . |
| 5,027,465 | 7/1991 | McKay . |
| 5,388,300 | 2/1995 | Hickey . |

FOREIGN PATENT DOCUMENTS

| | | |
|---|---|---|
| 84 21 443.0 | 11/1985 | Germany . |
| 88 04 854.3 | 5/1988 | Germany . |

*Primary Examiner*—Jenna Davis
*Attorney, Agent, or Firm*—Charles D. Levine

[57] ABSTRACT

A tape includes a backing layer and an adhesive layer formed on the backing layer. A plurality of lines of perforations extend across the tape to separate the tape into sheets. The sheets have progressively increasing lengths such that, when the sheets are wound into a roll, each sheet is longer than the sheet underneath it. When in a roll, the outermost sheet covers all of the lines of perforations to reduce instances of the tape tearing in a downweb direction.

9 Claims, 2 Drawing Sheets

5,763,038

PROGRESSIVELY PERFORATED TAPE ROLL

TECHNICAL FIELD

The present invention relates to tape rolls. More particularly, the present invention relates to perforated tape rolls.

BACKGROUND OF THE INVENTION

Most rolls of tape are used by first removing a length of tape from the roll before using the tape for its intended purpose. Typically, a length of tape is peeled from the roll and is cut for use. In some applications, the tape is used while on the roll and is removed after use.

Lint removal tape is used while still on a roll to remove lint and other small particles from fabric, such as clothing. The tape is removed from the roll only after use, to discard it. In roll form, lint removal tape is typically wound on a core with the adhesive side of the tape wound outwardly for use. A roll of lint removal tape is generally used on an applicator. Various lint removal tape rolls are known, such as those described in U.S. Pat. No. 5,027,465 and U.S. Pat. No. 5,388,300.

Rolls of tape are often perforated for easier removal of individual sheets. Material that has perforations and is wound into a roll becomes wavy and distorted because the perforations create a high spot in the roll due to pushed up material. Aligning perforations on a roll with each line of perforations substantially radially above the line of perforations on the sheet below it forms a lump in the roll. With a roll of 60 sheets, this can create a lump over 0.63 cm (0.25 in) high. This makes the roll out-of-round, making the roll difficult to unwind and use.

Also, with aligned lines of perforation, a user has difficulty determining which sheet to grab to remove a sheet. The user may grab more than one sheet, wasting material and often causing the material to tear improperly, in a downweb, longitudinal direction. Improper tearing also occurs without aligned perforations, where sheets have equal length and an outer sheet does not necessarily cover the adjacent inner sheet. There is a need for a perforated tape roll with improved cross-web tearability.

SUMMARY OF THE INVENTION

A length of tape has a first longitudinal end, a second longitudinal end, a first side edge, and a second side edge. The tape includes a backing layer and an adhesive layer on the backing layer. The tape is formable into a roll having a plurality of wraps.

A plurality of lines of perforations extend across at least most of the width of the tape between the first and second side edges to separate the tape into sheets. The sheets have progressively increasing lengths from the first end to the second end such that, when the sheets are wound into a roll, each sheet is longer than the sheet underneath it.

When the tape forms a roll, the outermost sheet has a free, leading edge and a trailing end defined by a line of perforations. The outermost sheet covers all of the lines of perforations. The line of perforations that defines the trailing end of the outermost sheet prevents the outermost sheet from adhering tightly to itself. This reduces instances of the tape tearing in a downweb direction.

DETAILED DESCRIPTION

Figure 1:
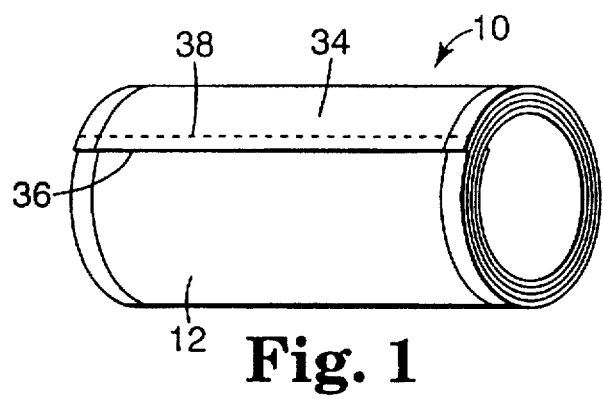
FIG. 1 is a perspective view of a roll of tape of the present invention.
Figure 2:
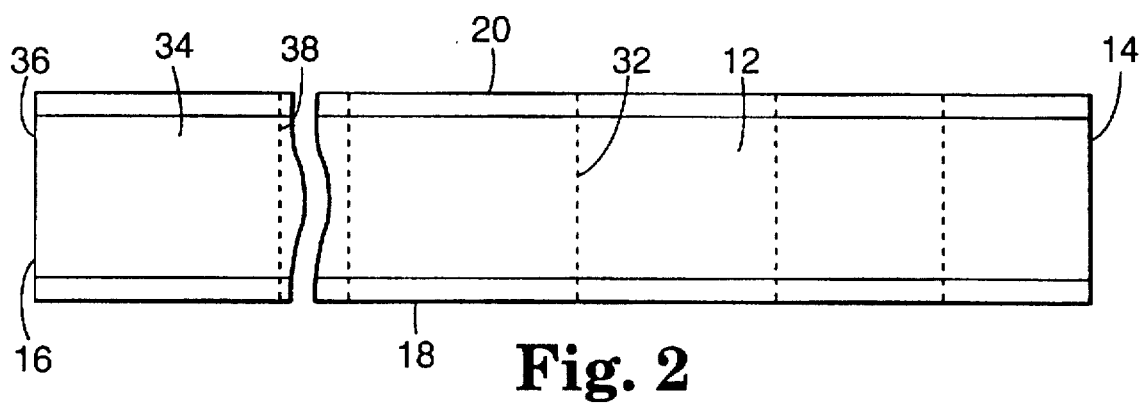
FIG. 2 is a top view of a portion of tape.
Figure 3:
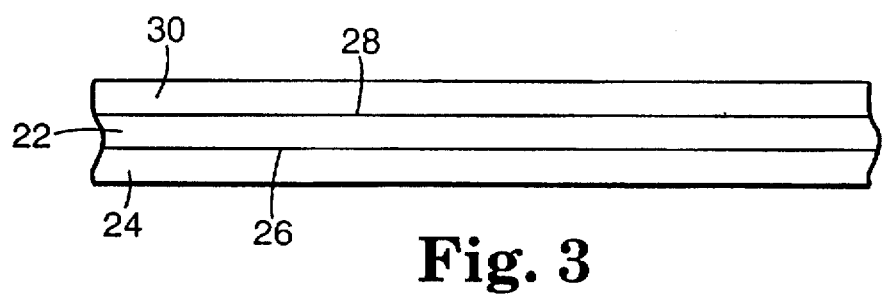
FIG. 3 is a side view of the tape of FIG. 2.

FIGS. 1–3 show a roll 10 of lint removal tape 12. As shown in FIG. 2, the tape 12 has a first longitudinal end 14, a second longitudinal end 16, a first side edge 18, and a second side edge 20. As shown in FIG. 3, the tape is formed of at least two layers, a backing layer 22 and an adhesive layer 24 and can be made from any known materials. The tape is formable into a roll having a plurality of wraps.

The backing layer 22 has a first side 26 and a second side 28 and can be made of, for example, paper or plastic film. Suitable paper backings include saturated flatstock and crepe. Suitable plastic film backings include polypropylene, polyethylene, copolymers of polypropylene and polyethylene, polyesters, and vinyl acetates. The polypropylene can be biaxially oriented polypropylene (BOPP) or simultaneously biaxially oriented polypropylene (SBOPP). The backing material can be compostible, degradable, colored, printed, and can be of different surface textures or embossed.

The adhesive layer 24 is placed on the first side 26 of the backing layer 22. It can be formed on the entire first side, or the backing layer can be uncoated by adhesive along one or both side edges. Alternatively, the side edges can be adhesive coated and then detackified by using waxes, lacquers, or inks for example.

The adhesive can include hotmelt-coated formulations, transfer-coated formulations, solvent-coated formulations, and latex formulations. Useful adhesives according to the present invention include all pressure sensitive adhesives. Pressure sensitive adhesives are normally tacky at room temperature and can be adhered to a surface by application of, at most, light finger pressure. Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

The tape 12 is formed into a roll 10 having a plurality of wraps with the adhesive layer 24 facing outwardly by rolling the tape on only itself. Support material, such as a core, a liner, or any other material that could lend support and provide rigidity and strength to the roll of tape, is optional. In the illustrated embodiments, none is used.

The roll 10 of tape could also include a third layer. A low adhesion backside (LAB) layer 30 can be formed on the second side 28 of the backing layer 22 to facilitate removing the outer wrap of tape from the roll 10. Suitable LAB layers include silicones, fluorochemicals, acrylates, and polyvinylacetates. Numerous other layers can be added to the tape, such as primers to increase the adhesion of adhesive layer 24 to backing layer 22. Also, printed material can be located on the first side of the backing layer under the adhesive, or on the second side of the backing layer either under or over any LAB layer 30. This printed material can be advertising, instructions, or other information. The tape could contain deodorants, perfumes, antistatic materials, and encapsulated cleaning chemicals. Also, the backing layer 22 can be modified by flame treatment, corona treatment, and roughening.

A plurality of lines of perforations 32 divide the tape into discrete sheets, to help remove the outer wrap of tape from the roll 10. The perforations 32 are made before the tape 12 is formed into a roll 10. Each sheet is defined by the first and second side edges 18, 20, and two adjacent lines of perforations 32.

There are n lines of perforations 32 extending across at least most of the width of the tape 12 between the first and second side edges 18, 20 to separate the tape into n+1 sheets. The plurality of lines of perforations 32 can extend partially or completely across the width of the tape. The sheets have progressively increasing lengths from the first longitudinal end 14 to the second longitudinal end 16 such that when the sheets are wound into a roll each sheet is longer than the sheet underneath it.

Figure 4:
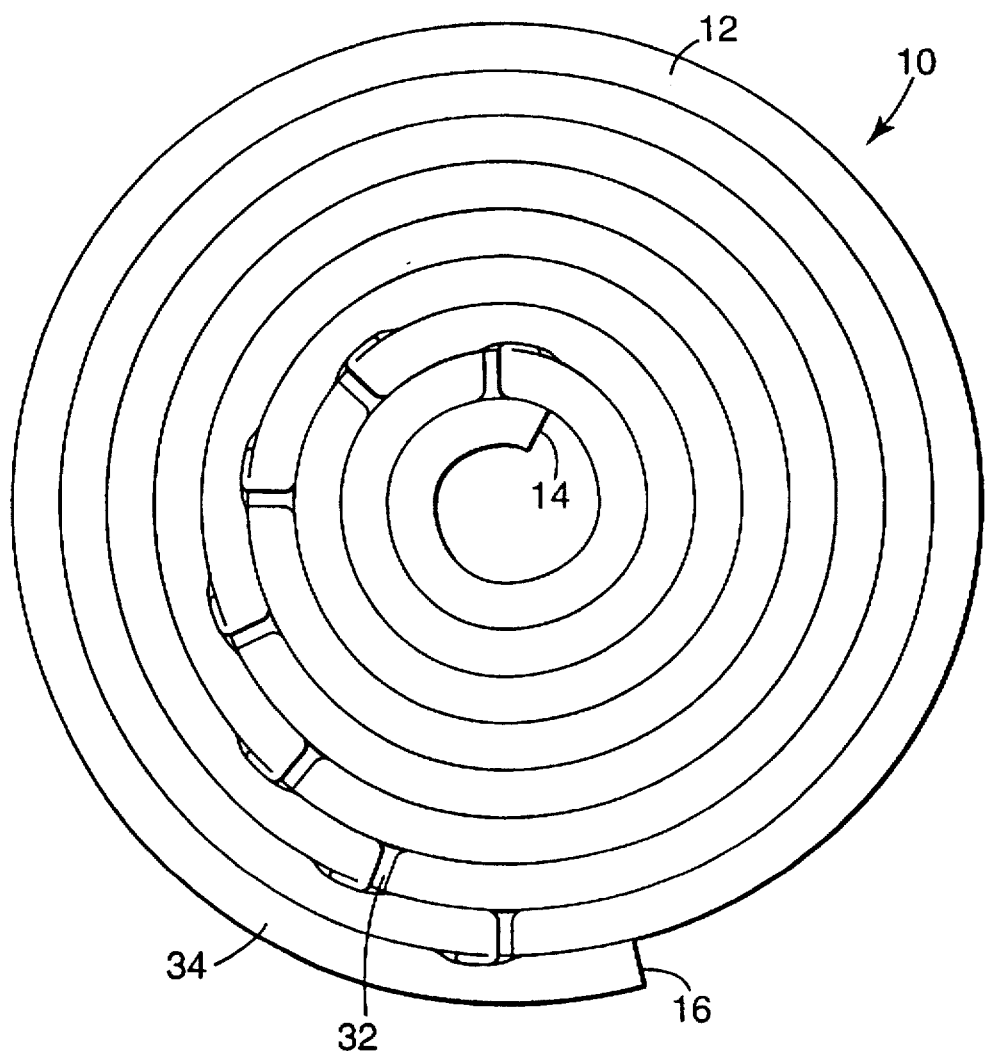
FIG. 4 is a side view of the roll of tape of FIG. 1.

When the tape 12 forms a roll 10, the outermost sheet 34 has a free, leading edge 36 and a trailing end 38 defined by a line of perforations. As shown in FIG. 4, the outermost sheet 34 covers all of the lines of perforations 32. Starting from the inside of the roll 10, each line of perforations 32 can be said to advance with each additional wrap of tape. When the tape is wound into a roll, each sheet completely covers the sheet before it.

The line of perforations that defines the trailing end 38 of the outermost sheet prevents the outermost sheet from adhering tightly to itself. This reduces instances of the tape tearing in a downweb direction nonparallel to the line of perforations. This occurs because the perforations act as a detackified area. In one embodiment (such as where the perforating knife has a longer side on the downweb side of the tape), during the perforating process, at least some of the perforations in each line create folded over material with adhesive facing down, away from the outer sheets), are slightly higher, and have holes. These features individually and in combination act as a detackified area. Also, a pull roll can be overdriven to elongate the perforated area and make a larger detackified area. Thus, the line of perforations below the outermost sheet (which define the trailing end of the outermost sheet) helps remove this sheet.

An overlap (the distance the line of perforations 32 of the trailing end 38 is being behind the leading edge 36 of the outermost sheet 34) of approximately 0.3175 cm (0.125 in) works well to assist tearability. An overlap of more than 0.635 cm (0.250 in) or an underlap (the distance the line of perforations 32 of the trailing end 38 is ahead of the leading edge 36 of the outermost sheet 34) do not assist tearability.

Any number of perforations can be used to create the line and any shape and length for the perforations can be used. A perforator using a high performance motion control system can be designed to create sheets of increasing length. The control system changes the speed of the perforator to add the necessary length to successive sheets. This length is compounded until the desired sheet count is attained. The control system then automatically resets the sheet count and length to the start of a new roll. With an overlap length of approximately 0.3175 cm (0.125 in), each sheet should be 0.3175 cm+0.076 cm (0.125 in+0.030 in) longer than the previous sheet. The 0.076 cm (0.030 in) (which is π times twice the thickness of the tape) is added to compensate for the larger roll diameter as the tape is wound (for a tape width of 0.0122 cm (0.0048 in) and a starting diameter of 4.45 cm (1.75 in)).

Various changes and modifications can be made in the invention without departing from its scope or spirit. For example, although the illustrated embodiments show coreless rolls of lint removal tape, the invention can be used with cored rolls of lint removal tape, other rolls of tape wound adhesive side out, and rolls of tape wound adhesive side in.

I claim:

1. A roll of tape wherein the tape has a first longitudinal end, a second longitudinal end, a first side edge, and a second side edge, the roll of tape comprising:

a backing layer having a first side and a second side;

an adhesive layer on the first side of the backing layer, wherein the tape is formed into a roll having a plurality of wraps; and a plurality of lines of perforations extending across at least most of the width of the tape between the first and second side edges to separate the tape into sheets such that starting from the inside of the roll, each line of perforations can be said to advance with each additional wrap of tape to create sheets having progressively increasing lengths from the first longitudinal end of the tape to the second longitudinal end of the tape, wherein when the sheets are wound into a roll, each sheet is longer than the sheet underneath it by an overlap length.

2. The roll of tape of claim 1 wherein the outermost sheet has a free, leading edge and a trailing end defined by a line of perforations, wherein the outermost sheet covers all of the lines of perforations.

3. The roll of tape of claim 1 wherein the line of perforations that defines the trailing end of the outermost sheet prevents the outermost sheet from adhering tightly to itself to reduce instances of the tape tearing in a downweb direction nonparallel to the line of perforations.

4. The roll of tape of claim 3 wherein at least some of the perforations comprise folded over material with adhesive facing down, away from the outer sheets to create a slightly higher detackified area.

5. The roll of tape of claim 1 wherein each sheet, compared to the adjacent sheet closer to the first longitudinal end, is longer by an amount equal to π times twice the thickness of the tape plus a selected overlap length.

6. The roll of tape of claim 5 wherein the overlap length is no more than 1.270 cm (0.500 in).

7. The roll of tape of claim 1 wherein the plurality of lines of perforations extend across the entire width of the tape from the first side edge to the second side edge.

8. The roll of tape of claim 1 wherein the backing layer comprises at least one of paper and plastic.

9. The roll of tape of claim 1 which is a lint removal tape.

* * * * *

(12) EX PARTE REEXAMINATION CERTIFICATE (5909th)
United States Patent
Wood

(10) Patent Number: US 5,763,038 C1
(45) Certificate Issued: Oct. 2, 2007

(54) PROGRESSIVELY PERFORATED TAPE ROLL

(75) Inventor: Thomas L. Wood, Maplewood, MN (US)

(73) Assignee: Minnesota Mining and Manufacturing Company, St. Paul, MN (US)

Reexamination Request:
No. 90/007,846, Dec. 13, 2005

Reexamination Certificate for:
Patent No.: 5,763,038
Issued: Jun. 9, 1998
Appl. No.: 08/806,186
Filed: Feb. 25, 1997

(51) Int. Cl.
*B65H 18/00* (2006.01)
*B65H 18/28* (2006.01)
*A47L 25/00* (2006.01)

(52) U.S. Cl. .................. 428/43; 15/104.002; 428/343; 428/906

(58) Field of Classification Search .................. None
See application file for complete search history.

(56) References Cited

U.S. PATENT DOCUMENTS

| 3,013,367 A | * | 12/1961 | La Sarre | ....................... 53/520 |
| 3,770,542 A | * | 11/1973 | Hall et al. | .................. 156/184 |
| 4,905,337 A | | 3/1990 | McKay | |
| 5,763,038 A | | 6/1998 | Wood | |

FOREIGN PATENT DOCUMENTS

| JP | S37-24126 | 9/1962 |
| JP | S60-29157 U | 2/1985 |
| JP | 63-11541 U | 1/1988 |
| JP | HEI 1-11167 Y2 | 3/1989 |
| JP | 02-071721 A | 3/1990 |
| JP | 05-211984 A | 8/1993 |

* cited by examiner

*Primary Examiner*—Peter C. English

(57) ABSTRACT

A tape includes a backing layer and an adhesive layer formed on the backing layer. A plurality of lines of perforations extend across the tape to separate the tape into sheets. The sheets have progressively increasing lengths such that, when the sheets are wound into a roll, each sheet is longer than the sheet underneath it. When in a roll, the outermost sheet covers all of the lines of perforations to reduce instances of the tape tearing in a downweb direction.

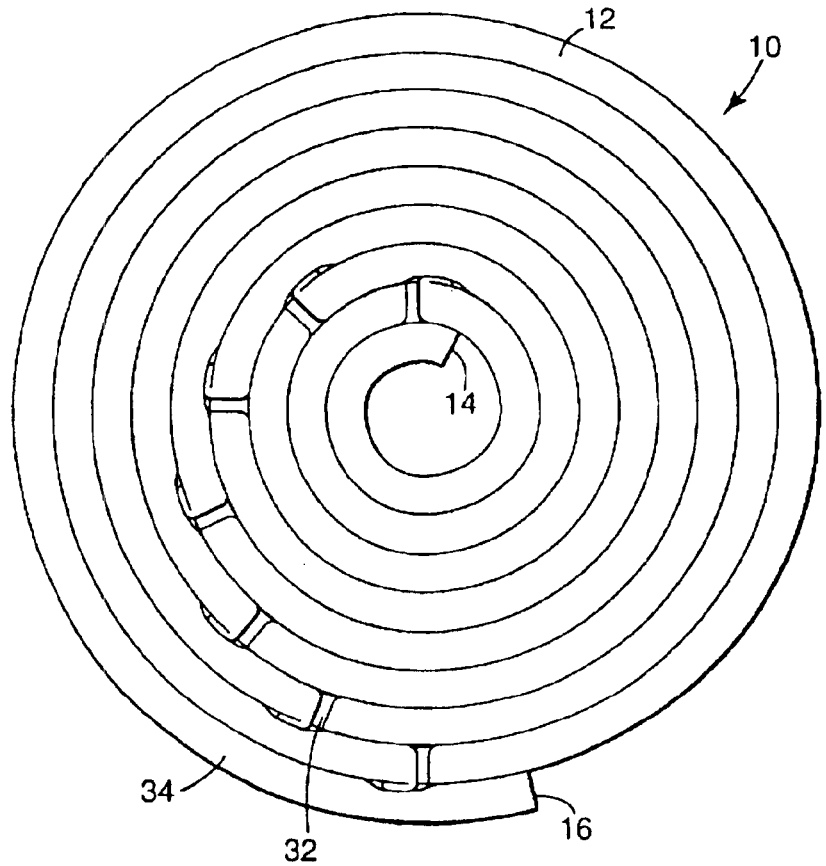

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 3 is cancelled.

Claims 1 and 4 are determined to be patentable as amended.

Claims 2 and 5–9, dependent on an amended claim, are determined to be patentable.

1. A roll of tape wherein the tape has a first longitudinal end, a second longitudinal end, a first side edge, and a second side edge, the roll of tape comprising:

a backing layer having a first side and a second side;

an adhesive layer on the first side of the backing layer, wherein the tape is formed into a roll *of tape* having a plurality of wraps; and a plurality of lines of perforations extending across at least most of the width of the tape between the first and second side edges to separate the tape into sheets such that starting from the inside of the roll, each line of perforations can be said to advance with each additional wrap of tape to create sheets having progressively increasing lengths from the first longitudinal end of the tape to the second longitudinal end of the tape, wherein when the sheets are wound into a roll, each sheet is longer than the sheet underneath it by an overlap length *and wherein the line of perforations that defines the trailing end of the outermost sheet prevents the outermost sheet from adhering tightly to itself.*

4. The roll of tape of claim [3] *1* wherein at least some of the perforations comprise folded over material with adhesive facing down, away from the outer sheets to create a slightly higher detackified area.

\* \* \* \* \*